United States Patent
Snavely, Jr. et al.

[11] 3,844,349
[45] Oct. 29, 1974

[54] PETROLEUM PRODUCTION BY STEAM INJECTION

[75] Inventors: Earl S. Snavely, Jr., Arlington, Tex.; Theodore A. Bertness, Whittier, Calif.

[73] Assignee: Mobil Oil Corporation, New York, N.Y.

[22] Filed: Jan. 26, 1973

[21] Appl. No.: 326,929

[52] U.S. Cl. .............................. 166/272, 423/242
[51] Int. Cl. ..................... B01d 53/34, E21b 43/24
[58] Field of Search.... 166/272, 271, 303, 265–267; 423/242, 215.5; 60/1

[56] References Cited
UNITED STATES PATENTS

| | | | |
|---|---|---|---|
| 895,612 | 8/1908 | Baker | 166/272 X |
| 1,271,899 | 7/1918 | Howard et al. | 423/215.5 X |
| 1,422,204 | 7/1922 | Hoover et al. | 166/272 X |
| 2,073,039 | 3/1937 | Wilton et al. | 423/242 |
| 2,113,198 | 4/1938 | Nonhebel et al. | 423/242 |
| 2,813,583 | 11/1957 | Marx et al. | 166/272 X |
| 3,193,009 | 7/1965 | Wallace et al. | 166/272 |
| 3,687,613 | 8/1972 | Rickard | 423/242 |

*Primary Examiner*—Stephen J. Novosad
*Attorney, Agent, or Firm*—A. L. Gaboriault; Henry L. Ehrlich

[57] ABSTRACT

This specification discloses a method of producing petroleum from a petroleum-bearing formation. Steam is generated in a steam generator that is fired with a sulfur-containing fuel and the steam is injected into the petroleum-bearing formation and petroleum is produced therefrom. The firing of the steam generator with the sulfur-containing fuel produces a flue gas which contains sulfur oxides. The flue gas is passed through an emission scrubber vessel in counterflow with an alkaline water that is flowed through the vessel to scrub the sulfur oxides from the flue gas and reduce the alkalinity of the alkaline water. The scrubbed flue gas and the water of the reduced alkalinity are discharged from the emission scrubber vessel and at least a portion of the discharged water of reduced alkalinity is injected into the steam generator as feed water.

9 Claims, 1 Drawing Figure

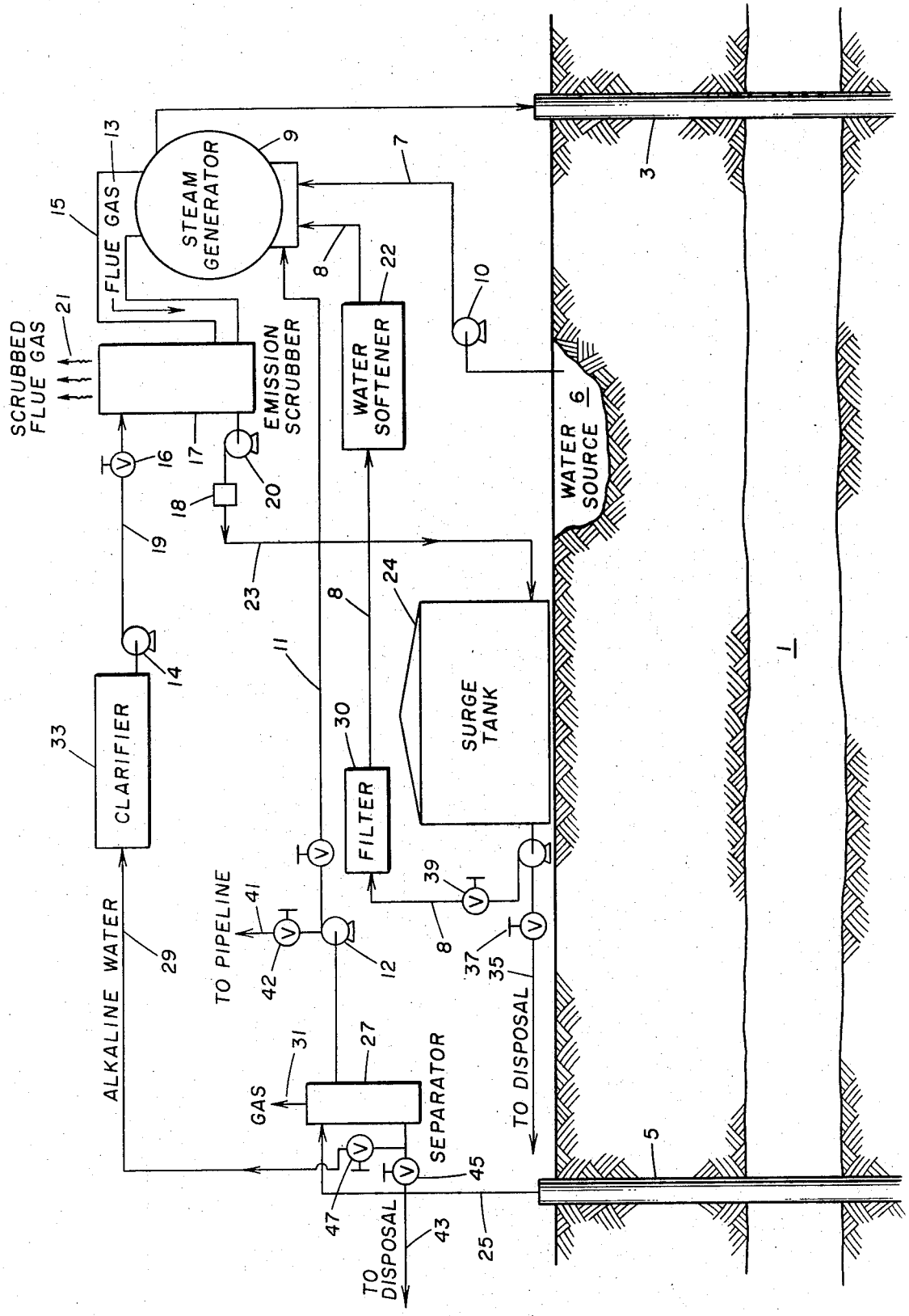

PETROLEUM PRODUCTION BY STEAM INJECTION

BACKGROUND OF THE INVENTION

This invention is directed to a method of producing petroleum from a petroleum-bearing formation. More particularly, this invention is directed to a method of producing petroleum from a petroleum-bearing formation wherein there is injected into the formation steam that is generated by firing a steam generator with a sulfur-containing fuel and thereby emitting a flue gas containing sulfur oxides.

In the production of steam for use in a steam stimulation oil recovery method, water is injected into a steam generator as feed water and fuel is burned to supply heat to vaporize the water. Fuel, such as gas or oil, is burned in the steam generator to convert the water injected thereinto into steam. The steam is then injected via an injection well into a producing formation.

In the burning of a fuel in a steam generator to produce steam for a steam stimulation oil recovery method, a flue gas is produced which has in the past normally been vented to the atmosphere. However, in the burning of a sulfur-containing fuel, the flue gas contains sulfur oxides which desirably should not be vented to the atmosphere.

In an article published in CHEMICAL WEEK, Sept. 2, 1970, entitled "Smokestack Oxides May Get Sea-Water Scrubbing", there is described a process that uses sea water to scrub sulfur oxides from power plant smokestack gases. In accordance with this process, sea water is contacted with gases containing sulfur dioxide and the sulfur dioxide is removed therefrom. An earlier reference that is directed to removing sulfur dioxide from furnace gases is U.S. Pat. No. 1,271,899 to Henry Howard et al. Howard et al. describes a process wherein furnace gases are first treated to remove dust and sulfur trioxide therefrom. The partially purified gas mixture is then brought into contact in a scrubbing tower with a dilute solution of alkali which effectually removes the greater part of the sulfur dioxide and yields a harmless exit gas and a dilute solution of sodium sulfite.

SUMMARY OF THE INVENTION

This invention is directed to the method of producing petroleum from a petroleum-bearing formation penetrated by a well means. Steam is generated by injecting feed water into a steam generator and firing the steam generator with a sulfur-containing fuel and thereby emitting a flue gas containing sulfur oxides. The steam is injected via the well means into the petroleum-bearing formation and petroleum is produced via the well means from the petroleum-bearing formation. The flue gas containing sulfur oxides is passed through an emission scrubber vessel in counterflow with an alkaline water that is flowed through the vessel to scrub the sulfur oxides from the flue gas and reduce the alkalinity of the alkaline water. The scrubbed flue gas and the water of reduced alkalinity are discharged from the emission scrubber vessel and at least a portion of the discharged water of reduced alkalinity is injected into the steam generator as feed water.

In accordance with an embodiment the steam is injected into a formation containing petroleum and an alkaline water and the petroleum and alkaline water are produced from the formation. At least a portion of the produced alkaline water is clarified and passed through an emission scrubber vessel. The flue gas containing sulfur oxides is passed through the emission scrubber vessel in counterflow with the clarified alkaline water, and sulfur oxides are scrubbed from the flue gas and the alkalinity of the clarified alkaline water is reduced. In accordance with a further embodiment, the alkaline water is clarified by being passed through a closed depurator vessel which is charged initially with carbon dioxide. Air is forced in diffused bubbles through the produced alkaline water in the depurator vessel and the air is recycled through the depurator vessel to clarify the produced alkaline water. In accordance with still further embodiments, the water of reduced alkalinity which is discharged from the emission scrubber vessel is passed through a filter and through a water softener and thence into the steam generator as feed water.

BRIEF DESCRIPTION OF THE DRAWING

The drawing is a schematic flow diagram illustrating the method of the invention.

DESCRIPTION OF THE PREFERRED EMBODIMENTS

This invention is directed to a method of producing petroleum from a petroleum-bearing formation by injecting steam into the formation, the steam being generated by firing a steam generator with a sulfur-containing fuel and thereby emitting a flue gas containing sulfur oxides and scrubbing the flue gas with an alkaline water to remove the sulfur oxides therefrom.

With reference to the drawing, there is shown a petroleum-bearing formation 1 penetrated by a well means here illustrated as an injection well 3 and production well 5 though the well means may take the form of a single well or a plurality of wells. Water from a water source 6 is pumped by pump 10 through line 7 and into a steam generator 9 as generator feed water. A sulfur-containing fuel is fired in the steam generator to convert the feed water into steam. The sulfur-containing fuel may be, for example, pumped by pump 12 through line 11 and into the steam generator 9 where it is burned to heat the feed water and generate steam. The burning of the sulfur-containing fuel in the steam generator 9 produces a flue gas 13 which contains sulfur oxides and in particular sulfur dioxide ($SO_2$). The flue gas 13 is flowed through a conduit 15 and into an emission scrubber vessel 17. An alkaline water is pumped by pump 14 through line 19 and into the emission scrubber vessel 17. The pump 14 may be a variable speed pump and line 19 may be provided with a valve 16 whereby the rate of flow of the alkaline water into the emission scrubber vessel 17 may be controlled. The flue gas 13 containing sulfur oxides and the alkaline water are flowed through the emission scrubber vessel 17 in counterflow one with the other and the sulfur oxides are scrubbed from the flue gas. The scrubbed flue gas 21 is discharged from the emission scrubber vessel and may be vented to the atmosphere. The alkaline water, in passing through the emission scrubber vessel 17 in counterflow with the flue gas 13, is reduced in alkalinity. It is desirable to maintain the pH of the water of reduced alkalinity exiting from the emission scrubber vessel 17 via line 23 at a predetermined value. The pH of the water exiting from the emission scrubber vessel 17 may be determined, for example, by a pH meter 18 provided in communication with line 23. The pH of the alkaline water flowing through the emission scrubber vessel and exiting therefrom may be controlled by controlling the flow rate of the alkaline water through the emission scrubber vessel, for example, the slower the flow rate the lower the pH of the alkaline water exiting from the emission scrubber vessel. This flow rate may be controlled for example by controlling the variable speed pump 14 or the valve 16 in line 19 leading to the emission scrubber vessel. Also, there may be provided in line 23 leading from the emission scrubber vessel a pump 20 which may be a variable speed pump and a valve (not shown), either of which may be used to control the flow rate of the alkaline water through the emission scrubber vessel. Hydroxides may also be added if needed to increase the pH. The water of reduced alkalinity that is discharged from the emission scrubber vessel 17 through line 23 may be recirculated (not shown), particularly if the pH is high, through the emission scrubber vessel 17 and then may be collected in the surge tank 24.

The characteristics of the water exiting from the emission scrubber vessel vary with the pH value of the water. For example, the corrosiveness of the water increases greatly at pH values of less than 5. At the same time the solubility of suspended matter in the water increases with decreasing pH values. In particular, most scales which may be formed, for example, in the emission scrubber vessel, lines leading therefrom, and other associated equipment are more soluble in lower pH waters. Therefore, it is desirable to maintain the pH of the water exiting from the emission scrubber vessel at a predetermined pH value in order to control the characteristics of the water. When it is desirable to minimize the corrosive characteristics of the water, then a predetermined pH value of at least 5.0 and preferably at least 6.0 is selected. However, when it is desirable to dissolve scale or other foreign matter, a predetermined pH value of less than 5 is selected.

This water of reduced alkalinity is particularly suitable for use as generator feed water due to improved clarity and reduced tendency to form scales that results from the scrubbing action in the emission scrubber vessel, and has been found to be more suitable in some areas than available fresh water. Further, the use of this water as feed water reduces the amount of fresh water needed for the steam generator and thereby conserves available fresh water supplies. Also, the use of this water as feed water reduces the volume of water which must be disposed of, generally by injecting into disposal wells (not shown). In accordance with this invention, at least a portion of the water of reduced alkalinity is flowed from the surge tank 24 via line 8 and valve 39 into the steam generator 9 as feed water or make up water, thereby reducing the need for additional feed water from the water source 6. The water of reduced alkalinity may be treated by passing it through a filter 30 and water softener 22 prior to injecting it into the steam generator 9 as generator feed water. The excess water in the surge tank 24 may be flowed via line 35 and valve 37 to disposal facilities, such as disposal wells (not shown).

The reactions that take place in scrubbing sulfur dioxide from flue gas by contacting the flue gas with an aqueous alkaline solution of soluble bicarbonates are as follows:

$$CO_3^= + CO_2 + H_2O \rightleftarrows 2HCO_3^- \quad (1)$$

$$SO_2 + 2HCO_3^- \rightarrow SO_3^= + 2CO_2 + H_2O \quad (2)$$

$$SO_3^= + \tfrac{1}{2} O_2 \rightarrow SO_4^= \quad (3)$$

Insoluble carbonates, such as calcium carbonate ($CaCO_3$) may be dissolved by contact with carbonated water as follows:

$$CaCO_3 + CO_2 + H_2O \rightarrow Ca^{++} + 2HCO_3^- \quad (4)$$

The solution of equation (4) may then be used to scrub $SO_2$ as given in equations (2) and (3).

The function of the emission scrubber is to provide sufficient contact between the flue gas and the alkaline water in order to react the sulfur oxides and particularly the sulfur dioxide in the flue gas with the alkalinity of the water flowing through the unit. The size and particular design of the scrubber are dependent upon the reaction rate, the alkalinity of the water, and the volume of water needed to react with the sulfur oxides in the volume of flue gas to be scrubbed. The emission scrubber may be designed to employ, for example, Nutter V Slot trays or porcelain saddle packing to provide the contact between the flue gas and the alkaline water.

By use of the term "alkaline water" is meant a water which has basic properties, that is, that it will neutralize an acid by reaction of the basic components of the water with the acid to form salts. In water analysis, alkalinity represents the carbonates, bicarbonates, hydroxides and occasionally the borates, silicates and phosphates in the water. The water should contain sufficient alkalinity to react with all of the sulfur oxides contained in the flue gas as the alkaline water and flue gas pass in counterflow one with the other through the emission scrubber vessel. The optimum alkalinity in the water depends, among other things, upon the amount of sulfur oxides in the flue gas, the flow rates of the flue gas and alkaline water through the emission scrubber, and the efficiency of the emission scrubber.

In the burning of a sulfur-containing fuel to generate steam for a steam stimulation oil recovery process very large amounts of sulfur oxides are formed, thereby requiring very large amounts of alkali to react with and remove the sulfur oxides. For example, a steam stimulation process in an oil field may easily employ as many as 25 fuel-fired steam generators which each burn 80 barrels of fuel per day. The burning of fuel containing 2.5 percent sulfur in these steam generators would produce 30,000 pounds of $SO_2$ per day. To remove 80 percent of this amount of $SO_2$ by using limestone as a source of the alkali would require about 37,000 pounds per day of limestone and would produce as a by-product about 44,400 pounds of calcium sulfite ($CaSO_3$) to be disposed of. water. The water should contain In a copending application, Ser. No. 326,930, entitled PROCESS FOR TREATING FLUE GASES TO REDUCE AIR POLLUTION, by Theodore A. Bertness and Earl S. Snavely, Jr., filed on even date, there is described a process wherein alkalinity for scrubbing a flue gas is supplied by providing a well means that extends into the earth and penetrates a subsurface formation and providing alkaline water therefrom. The subsurface formation may contain therein an alkaline water or salts from the groups of the alkaline earth metals and alkali metals. Where the formation contains alkaline salts the alkaline water is produced in situ by passing water via the well means into the formation to leach or dissolve the alkaline salt therefrom and form alkaline water which is then produced from the formation via the well means. Soluble alkaline salts such as sodium carbonate ($NaCO_3$) and potassium carbonate ($K_2CO_3$) are directly soluble in water. Insoluble salts such as calcium carbonate ($CaCO_3$) may be dissolved in a water which contains carbon dioxide dissolved therein.

In accordance with an embodiment of this invention, fluids are produced from the petroleum-bearing formation 1 via the production well 5 which include petroleum having sulfur therein and alkaline water. The produced fluids are flowed through line 25 to a separator 27 and there separated. The produced petroleum having sulfur therein may be flowed from separator 27 via pump 12 and line 11 to the steam generator 9 and there burned as fuel, emitting a flue gas 13 having sulfur oxides. The petroleum in excess of that required for firing the steam generator may be flowed via line 41 and valve 42 to a pipeline or storage facilities (not shown). The produced alkaline water may be flowed from the separator 27 via line 29, valve 47, clarifier 33, pump 14, and line 19 and into the emission scrubber vessel 17 and there employed for scrubbing the sulfur oxides from the flue gas 13 as previously described. Any excessive amounts of alkaline water may be flowed via line 43 and valve 45 to disposal facilities such as disposal wells (not shown).

The clarifier 33 may be a depurator vessel through which gas or air as a flotation aid is forced in diffused bubbles through the produced alkaline water to thereby clarify the alkaline water. In the operation of a depurator vessel through which air was passed through the alkaline water on a once-through basis, severe and rapid scaling occurred in the depurator vessel and associated lines. An analysis of this scaling problem indicated that the scaling occurred due to the air stripping of the carbon dioxide which was present in the produced water. The scaling problem was overcome by closing the depurator vessel and recycling the air that was used in the flotation process. The depurator vessel was charged initially with carbon dioxide to further aid in overcoming the scaling problem. Charging the depurator vessel with carbon dioxide at atmospheric pressure was found sufficient though lesser or greater amounts of carbon dioxide could be used to charge the vessel.

A field test has been carried out of this invention in a producing field wherein steam was injected via an injection well into a formation that contained an alkaline water and a petroleum having a high sulfur content. The steam was generated by firing a steam generator with the produced petroleum that contained about 2.5 percent sulfur and the steam generator emitted a flue gas that contained sulfur dioxide. The steam generator used was a 25 MM BTU/Hr unit and consumed as fuel 80 barrels per day of crude oil having a 2.5 percent sulfur content and emitted 5.7 MM cubic feet per day of flue gas. Alkaline water that was produced from the formation was flowed through an emission scrubber in counterflow with the flue gas from the steam generator.

By flowing 3,300 barrels of produced alkaline water per day through the emission scrubber in counterflow with the flue gas there was removed 94 percent of the sulfur dioxide and 21 percent of the nitrogen oxides from the flue gas. The pH of the alkaline water at the inlet and outlet of the scrubber was 8.1 and 6.3, respectively. The test further showed that flowing 2500 barrels of produced alkaline water per day through the emission scrubber was sufficient to remove more than 80 percent of the sulfur dioxide from the flue gas.

We claim:

1. A method of producing petroleum from a petroleum-bearing formation penetrated by a well means comprising:
   a. generating steam by injecting feed water into a steam generator and firing said steam generator with a sulfur-containing fuel, said steam generator emitting a flue gas containing sulfur oxides;
   b. injecting said steam via said well means into said petroleum-bearing formation;
   c. producing petroleum via said well means from said petroleum-bearing formation;
   d. passing said flue gas containing sulfur oxides through an emission scrubber vessel;
   e. passing an alkaline water through said emission scrubber vessel in counterflow with said flue gas to scrub said sulfur oxides from said flue gas and reduce the alkalinity of said alkaline water;
   f. discharging said scrubbed flue gas from said emission scrubber vessel;
   g. discharging said water of reduced alkalinity from said emission scrubber vessel; and
   h. injecting at least a portion of said discharged water of reduced alkalinity into said steam generator as feed water.

2. In the method of claim 1 prior to step (h) the further steps comprising:
   passing at least a portion of said discharged water of reduced alkalinity through a filter to remove particles therefrom; and
   passing said filtered discharged water of reduced alkalinity through a water softener to soften said water.

3. In a method of producing petroleum from a formation containing petroleum and alkaline water, said formation being penetrated by an injection well and a production well, the steps comprising:
   generating steam by injecting feed water into a steam generator and firing said steam generator with a sulfur-containing fuel, said steam generator emitting a flue gas containing sulfur oxides;
   injecting said steam via said injection well into said formation containing petroleum and alkaline water;
   producing petroleum and alkaline water via said production well from said formation;
   clarifying at least a portion of said produced alkaline water;
   passing said clarified alkaline water through an emission scrubber vessel;
   passing said flue gas containing sulfur oxides through said emission scrubber vessel in counterflow with said clarified alkaline water to scrub said sulfur oxides from said flue gas and reduce the alkalinity of said clarified alkaline water;
   discharging said scrubbed flue gas from said emission scrubber vessel; and discharging said water of reduced alkalinity from said emission scrubber vessel.

4. The method of claim 3 further comprising the step of injecting at least a portion of said discharged water of reduced alkalinity into said steam generator as feed water.

5. The method of claim 4 wherein said produced alkaline water is clarified by being passed through a closed depurator vessel and having gas forced in diffused bubbles through said produced alkaline water.

6. The method of claim 5 further comprising:
   charging initially said depurator vessel with carbon dioxide;
   forcing air in diffused bubbles through said produced alkaline water; and
   recycling said air through said depurator vessel to clarify said produced alkaline water.

7. In a method of producing petroleum from a formation containing petroleum and alkaline water, said formation being penetrated by a well means, the steps comprising:
   a. generating steam by injecting feed water into a steam generator and firing said steam generator with a sulfur-containing fuel, said steam generator emitting a flue gas containing sulfur oxides;
   b. injecting said steam via said well means into said formation;
   c. producing petroleum and alkaline water via said well means from said formation;
   d. clarifying at least a portion of said produced alkaline water by passing said portion of produced alkaline water through a closed depurator vessel that is charged initially with carbon dioxide and forcing air in diffused bubbles through said produced alkaline water and recycling said air through said depurator vessel;
   e. passing said clarified alkaline water through an emission scrubber vessel;
   f. passing said flue gas containing sulfur oxides through said emission scrubber vessel in counterflow with said clarified alkaline water to scrub said sulfur oxides from said flue gas and reduce alkalinity of said clarified alkaline water;
   g. discharging said scrubbed flue gas from said emission scrubber vessel;
   h. discharging said water of reduced alkalinity from said emission scrubber vessel;
   i. passing at least a portion of said discharged water of reduced alkalinity through a filter to remove particles therefrom;
   j. passing said filtered discharged water of reduced alkalinity through a water softener to soften said water; and
   k. passing said softened water into said steam generator as the feed water.

8. A method of producing petroleum from a petroleum-bearing formation penetrated by a well means comprising:
   a. generating a hot fluid by injecting feed water into a hot fluid generator and firing said hot fluid generator with a sulfur-containing fuel, said hot fluid generator emitting a flue gas containing sulfur oxides;
   b. injecting said hot fluid via said well means into said petroleum-bearing formation;
   c. producing petroleum via said well means from said petroleum-bearing formation;
   d. passing said flue gas containing sulfur oxides through an emission scrubber vessel;
   e. passing an alkaline water through said emission scrubber vessel in counterflow with said flue gas to scrub said sulfur oxides from said flue gas and reduce the alkalinity of said alkaline water;
   f. discharging said scrubbed flue gas from said emission scrubber vessel;
   g. discharging said water of reduced alkalinity from said scrubber vessel; and
   h. injecting at least a portion of said discharged water of reduced alkalinity into said hot fluid generator as feed water.

9. In a method of producing petroleum from a formation containing petroleum and alkaline water, said formation being penetrated by an injection well and a production well, the steps comprising:
   a. generating a hot fluid by injecting feed water into a hot fluid generator and firing said hot fluid generator with a sulfur-containing fluid, said hot fluid generator emitting a flue gas containing sulfur-oxides;
   b. injecting said hot fluid via said injection well into said formation containing petroleum and alkaline water;
   c. producing petroleum and alkaline water via said production well from said formation;
   d. clarifying at least a portion of said produced alkaline water;
   e. passing said clarified alkaline water through an emission scrubber vessel;
   f. passing said flue gas containing sulfur oxides through said emission scrubber vessel in counterflow with said clarified alkaline water to scrub said sulfur oxides from said flue gas and reduce the alkalinity of said clarified alkaline water;
   g. discharging said scrubbed flue gas from said emission scrubber vessel; and
   h. discharging said water of reduced alkalinity from said emission scrubber vessel.

* * * * *